(12) United States Patent
Ikebukuro et al.

(10) Patent No.: US 10,561,130 B2
(45) Date of Patent: Feb. 18, 2020

(54) ROLLER CLUTCH FOR FISHING REEL

(71) Applicant: Shimano Inc., Sakai, Osaka (JP)

(72) Inventors: Satoshi Ikebukuro, Osaka (JP); Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/158,983

(22) Filed: Oct. 12, 2018

(65) Prior Publication Data
US 2019/0141971 A1    May 16, 2019

(30) Foreign Application Priority Data
Nov. 16, 2017   (JP) .................................. 2017-220655

(51) Int. Cl.
*A01K 89/01* (2006.01)

(52) U.S. Cl.
CPC ................................ *A01K 89/0117* (2013.01)

(58) Field of Classification Search
CPC ................................................ A01K 89/0117
USPC ......................................................... 192/45
See application file for complete search history.

(56) References Cited

U.S. PATENT DOCUMENTS

| 6,019,301 | A | * | 2/2000 | Hitomi | ............... | A01K 89/0117 |
| | | | | | | 242/247 |
| 6,056,222 | A | * | 5/2000 | Hitomi | ............. | A01K 89/01143 |
| | | | | | | 242/247 |
| 2003/0146321 | A1 | * | 8/2003 | Chang | ............ | A01K 89/011223 |
| | | | | | | 242/247 |
| 2003/0150945 | A1 | * | 8/2003 | Hong | ................. | A01K 89/0117 |
| | | | | | | 242/247 |

FOREIGN PATENT DOCUMENTS

JP          9-289850 A     11/1997

* cited by examiner

*Primary Examiner* — Emmanuel M Marcelo
(74) *Attorney, Agent, or Firm* — Global IP Counselors, LLP

(57) ABSTRACT

A roller clutch for a fishing reel includes an outer ring, an inner ring, a roller, and a torsion spring. The roller is capable of moving between a transmitting position for transmitting power between the outer ring and the inner ring and a non-transmitting position for canceling the transmission of the power. The torsion spring biases the roller toward one of the transmitting position and the non-transmitting position. The torsion spring has a coil portion and a first arm portion extending from the coil portion. The first arm portion has a pressing portion. The pressing portion extends in a direction orthogonal to the axial direction of the roller and comes into contact with the roller.

9 Claims, 7 Drawing Sheets

ROLLER CLUTCH FOR FISHING REEL

CROSS-REFERENCE TO RELATED APPLICATIONS

This application claims priority to Japanese Patent Application No. 2017-220655, filed on Nov. 16, 2017. The entire disclosure of Japanese Patent Application No. 2017-220655 is hereby incorporated herein by reference.

BACKGROUND

Field of the Invention

The present invention relates to a roller clutch for a fishing reel.

Background Art

Roller clutches for fishing reels generally include an outer ring, an inner ring, and rollers, and can transmit rotation only in one direction. In general, in a roller clutch used for a fishing reel, the outer ring is attached to a reel body so as to be incapable of relative rotation. Thus, for example, if the inner ring rotates in a first direction relative to the outer ring, when each roller reaches the transmitting position and the rotation thereof is transmitted to the outer ring, the rotation of the inner ring in the first direction is prevented. However, if the inner ring rotates in an opposite second direction relative to the outer ring, the roller moves to a non-transmitting position and the rotation thereof is not transmitted to the outer ring; therefore, rotation in the second direction is possible.

In general, a roller is biased toward the transmitting position by a biasing member. For example, in the roller clutch disclosed in Japanese Laid-Open Patent Publication No. Hei 9(1997)-289850 a torsion spring biases the roller toward the transmitting position. The torsion spring has a coil portion and an arm portion that extends from the coil portion. The arm portion presses against the roller. The arm portion extends in the axial direction of the roller, so as to be inclined in the axial direction of the roller.

Thus, the arm portion is inclined with respect to the axial direction of the roller, that is, with respect to the rolling axis direction of the roller, and in that state, the arm portion contacts and presses against the roller. Thus, the contact/pressing position between the roller and the arm portion changes in the axial direction of the roller depending on the rolling position of the roller. As a result, there is the problem of the generation of a moment that tilts the roller. Therefore, an object of the present invention is to stably bias the roller.

SUMMARY

A roller clutch for a fishing reel according to one aspect of the present invention comprises an outer ring, an inner ring, rollers, and torsion springs. The inner ring is disposed on a radially inward side of the outer ring. The rollers are disposed between the inner ring and the outer ring. The rollers are capable of moving between a transmitting position for transmitting power between the outer ring and the inner ring and a non-transmitting position for canceling the transmission of power. The torsion springs bias the roller toward the transmitting position side or the non-transmitting position side. At least one of the torsion springs has a coil portion and an arm portion that extends from the coil portion. The arm portion has a pressing portion. The pressing portion extends in a direction orthogonal to the axial direction of the roller and comes into contact with the roller.

According to this configuration, the pressing portion that comes into contact with the roller extends in a direction orthogonal to the axial direction of the roller. Thus, even if the roller moves in the circumferential direction, the contact position between the pressing portion and the roller essentially does not change in the axial direction of the roller. Thus, a rotor tilting moment is not generated, and the roller can be stably biased.

Preferably, the coil portion is adjacent to the outer ring or the inner ring in the axial direction.

Preferably, the coil portion is disposed so as not to overlap the roller as viewed in the radial direction. By this configuration, since the coil portion and the roller portion do not overlap in the radial direction, the size in the radial direction can be reduced, which, in turn, allows a reduction in the size of the fishing reel.

Preferably, the arm portion also has an intermediate portion that extends in the axial direction of the roller, and the pressing portion extends from the distal end portion of the intermediate portion.

Preferably, the pressing portion contacts the central portion of the roller in the axial direction.

Preferably, the natural height of the coil portion is greater than the closed height of the coil portion.

Preferably, adjacent coils in the coil portions are not in contact with each other.

Preferably, the roller clutch of the fishing reel also comprises a housing member having a housing hole for accommodating the torsion springs.

By the present invention, it is possible to stably bias a roller.

DETAILED DESCRIPTION OF THE EMBODIMENTS

An embodiment of the roller clutch according to the present invention will be described below with reference to the drawings. Moreover, in the following descriptions, unless specified otherwise, the axial direction is the direction in which a rotational axis O of a rotor 15 extends, the radial direction is the direction of the radius of a circle that is centered on the rotational axis O, and the circumferential direction is the direction of the circumference of a circle centered on the rotational axis O.

Spinning Reel

Figure 1:
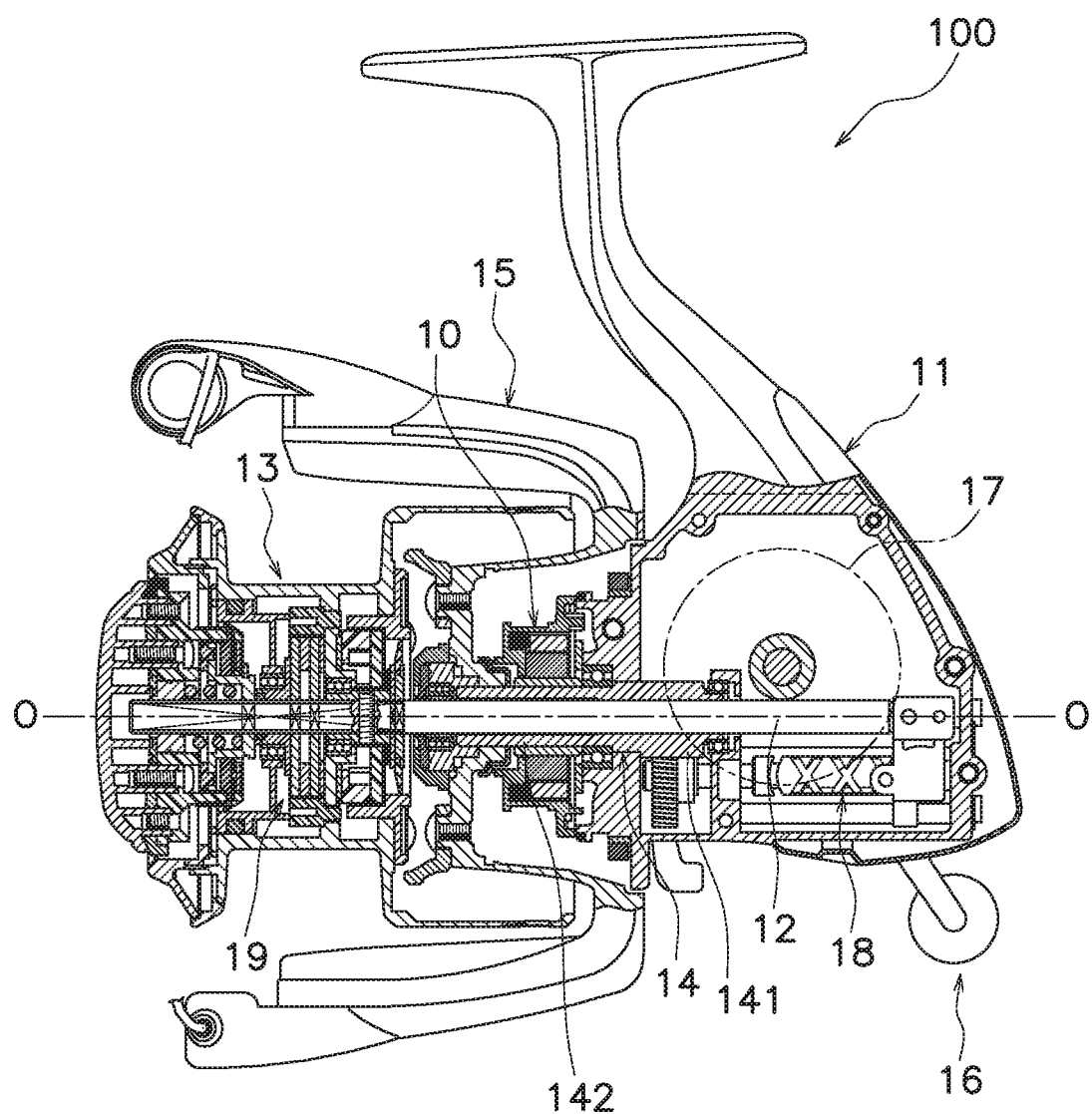
FIG. 1 is a cross-sectional view of a spinning reel.

As shown in FIG. 1, a spinning reel 100 casts or unreels a fishing line forward (the left direction in FIG. 1). The spinning reel 100 comprises a reel body 11, a spool shaft 12, a spool 13, a pinion gear 14, the rotor 15, a handle 16, and a roller clutch 10.

Reel Body

The reel body 11 comprises an internal space in which various mechanisms are housed. For example, a drive gear 17 and an oscillating mechanism 18 are housed in the reel body 11. In addition, the handle 16 is rotatably attached to a side surface of the reel body 11.

The drive gear 17 rotates by rotating the handle 16. The drive gear 17 is a face gear and meshes with the gear portion 141 of the pinion gear 14. The oscillating mechanism 18 reciprocates the spool shaft 12 in the axial direction.

Spool Shaft

The spool shaft 12 is disposed in the reel body 11. In particular, the spool shaft 12 extends forward from inside the reel body 11. The spool shaft 12 reciprocates back and forth by rotating the handle 16. More specifically, the rotation of the handle 16 causes the spool shaft 12 to reciprocate back and forth via the drive gear 17 and the oscillating mechanism 18.

Spool

The spool 13 is a member around which the fishing line is wound. The spool 13 is mounted on the distal end portion of the spool shaft 12 via a drag mechanism 19. The spool 13 reciprocates back and forth integrally with the spool shaft 12.

Pinion Gear

The pinion gear 14 is disposed in the reel body 11. Specifically, the pinion gear 14 extends forward from inside the reel body 11. The pinion gear 14 is disposed so as to be rotatable about the spool shaft 12. The pinion gear 14 is formed in a tubular shape, and the spool shaft 12 extends inside the pinion gear 14. Preferably, the pinion gear 14 is supported on the reel body 11 via a plurality of bearings, so that the inner circumferential surface of the pinion gear 14 and the outer circumferential surface of the spool shaft 12 do not come into contact with each other.

The pinion gear 14 comprises a gear portion 141 and a mounting portion 142. The gear portion 141 is positioned at the rear portion of the pinion gear 14 and meshes with the drive gear 17. The mounting portion 142 is positioned at the front portion of the pinion gear 14. Various members are attached to the mounting portion 142. The mounting portion 142 of the pinion gear 14 is formed in a cylindrical shape and has a pair of flat surfaces on the outer circumferential surface. The flat surfaces extend in the axial direction and are parallel to each other.

Rotor

The rotor 15 is a member for winding the fishing line around the spool 13. The rotor 15 is fixed to the pinion gear 14 and rotates integrally with the pinion gear 14. That is, the rotor 15 cannot rotate relative to the pinion gear 14. The rotor 15 is attached to the mounting portion 142 of the pinion gear 14.

Roller Clutch

The roller clutch 10 is configured to be capable of transmitting power only in one direction. That is, the roller clutch 10 is configured as a one-way clutch.

Figure 2:
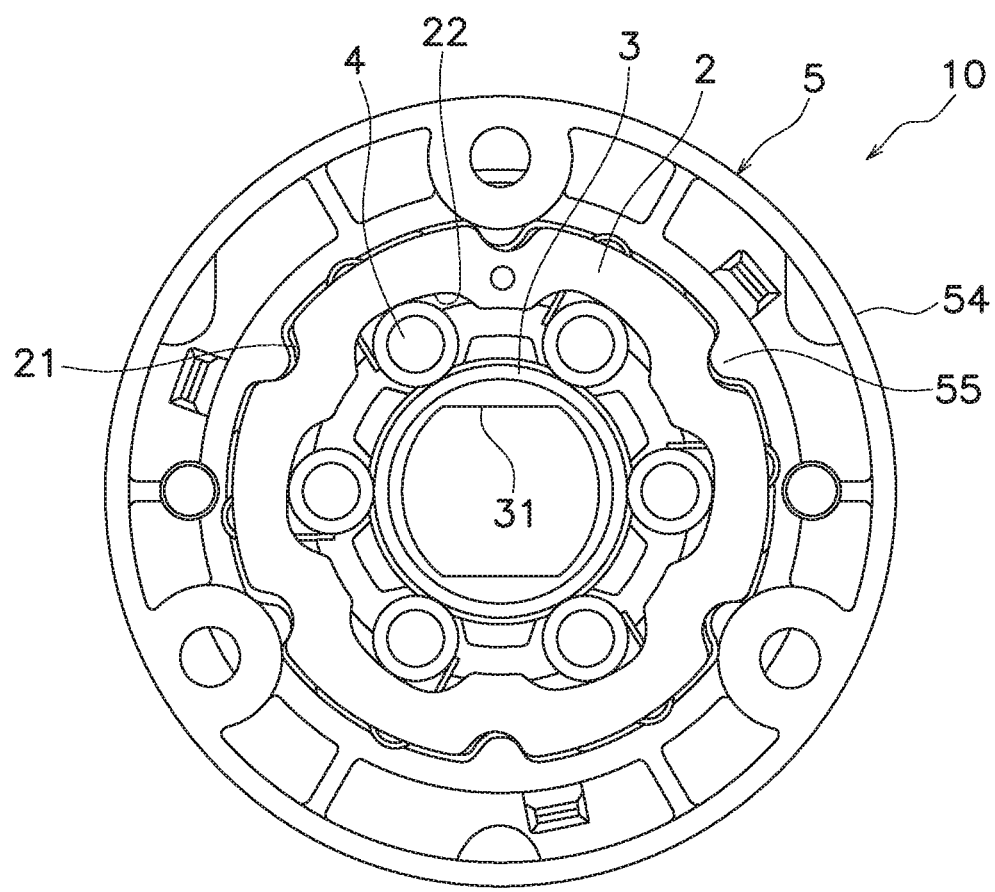
FIG. 2 is a front view of a roller clutch.
Figure 3:
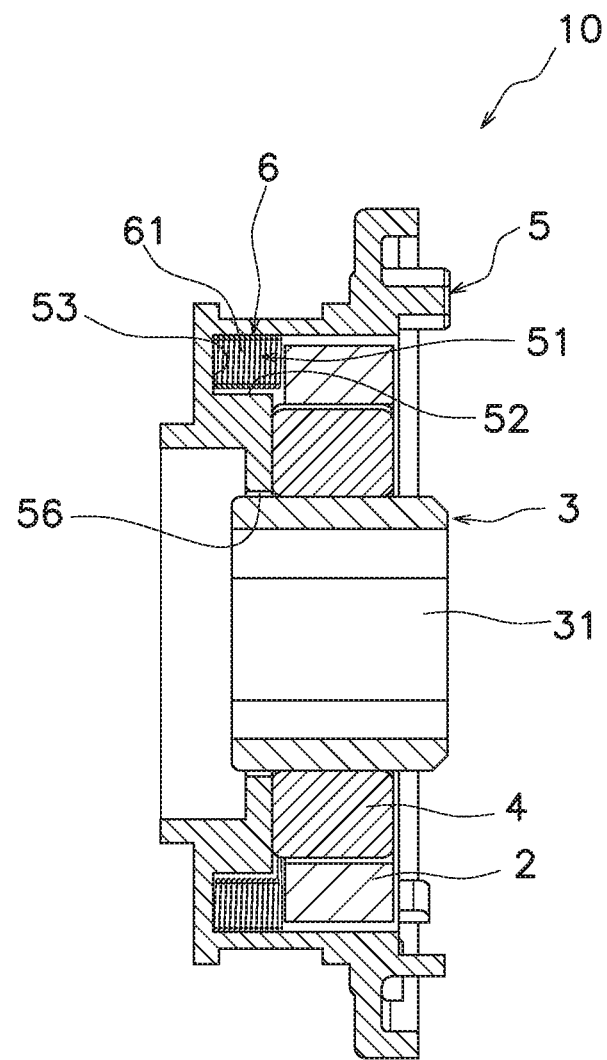
FIG. 3 is a lateral cross-sectional view of the roller clutch.

As shown in FIGS. 2 and 3, the roller clutch 10 comprises an outer ring 2, an inner ring 3, a plurality of rollers 4, a housing member 5, and a plurality of torsion springs 6.

Housing Member

The housing member 5 is fixed to the reel body 11. Specifically, the housing member 5 is fixed to the reel body 11 with bolts or the like. Thus, the housing member 5 does not rotate about the rotational axis O.

Figure 4:
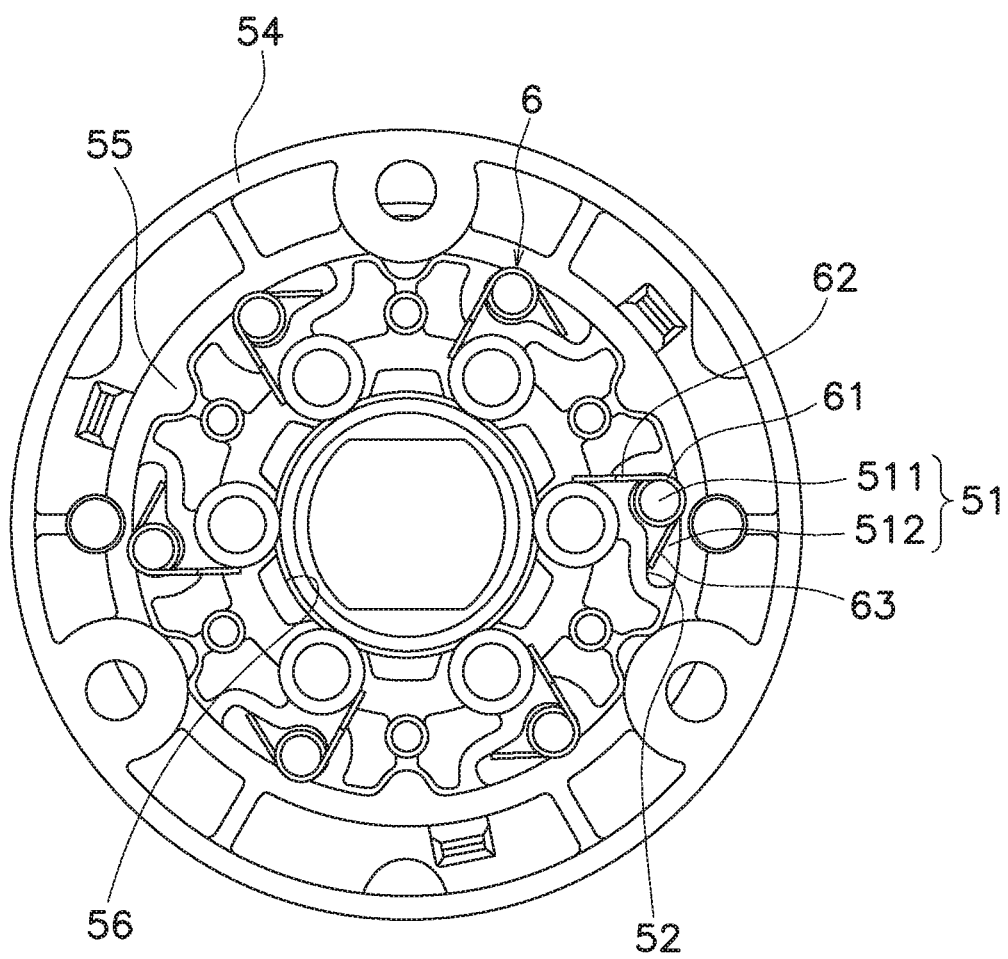
FIG. 4 is a front view of the roller clutch in a state in which an outer ring has been removed.
Figure 5:
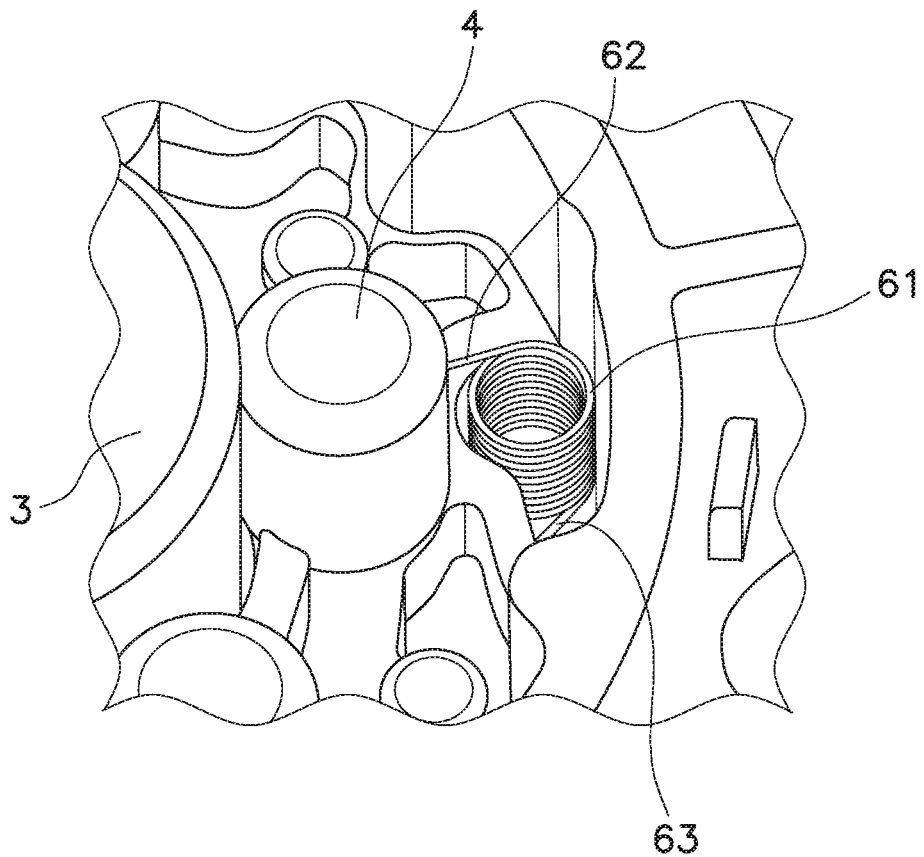
FIG. 5 is an enlarged perspective view of the roller clutch in a state in which the outer ring has been removed.

As shown in FIGS. 3 to 5, the housing member 5 comprises a plurality of housing holes 51. Each housing hole 51 accommodates a torsion spring 6. The housing holes 51 are disposed at intervals in the circumferential direction. The housing holes 51 do not need to pass through the housing member 5 in the axial direction. That is, each housing hole 51 can be a recessed portion.

In his embodiment, each housing hole 51 is defined by an inner wall surface 52 and a bottom surface 53. As shown in FIG. 4, the inner wall surface 52 is connected continuously. That is, in a front view the inner wall surface 52 is connected over the entire circumference and is formed in an annular shape. Therefore, except for the opening-end surface, the housing hole 51 is closed.

As shown in FIG. 3, the bottom surface 53 defines one end surface of the housing hole 51 in the axial direction. The bottom surface 53 is a flat surface. That is, no protrusions or the like are formed on the bottom surface 53. The other end surface of each housing hole 51 is open in the axial direction.

As shown in FIG. 4, each housing hole 51 comprises a cylindrical portion 511 and an extended portion 512. The extended portion 512 extends from the cylindrical portion 511 in the circumferential direction. The cylindrical portion 511 and the extended portion 512 are integrally formed. The cylindrical portion 511 is the portion accommodating the coil portion 61, which is described below, and the extended portion 512 is the portion accommodating the second arm portion 63, which is described below.

In addition, as shown in FIGS. 3 and 4, the housing member 5 comprises an outer peripheral wall portion 54, a plurality of engagement protrusions 55, and a through-hole 56. The outer peripheral wall portion 54 is formed in an annular shape centered on the rotational axis O. Each engagement protrusion 55 protrudes from the outer peripheral wall portion 54 radially inward. Additionally, each engagement protrusion 55 extends in the axial direction. The engagement protrusions 55 are disposed at intervals from each other in the circumferential direction. The through-hole 56 is formed in the central portion of the housing member 5 and extends in the axial direction.

Inner Ring

As shown in FIGS. 2 and 3, the inner ring 3 is disposed on the radially inner side of the outer ring 2. Specifically, the inner ring 3 extends into the interior of the through-hole 56 of the housing member 5. The inner ring 3 has a cylindrical shape and is attached to the mounting portion 142 of the pinion gear 14. A pair of engagement surfaces 31 are formed on the inner circumferential surface of the inner ring 3. Each engagement surface 31 of the inner ring 3 engages each flat surface of the mounting portion 142 of the pinion gear 14. As a result, the inner ring 3 rotates integrally with the pinion gear 14.

Outer Ring

As shown in FIG. 2, the outer ring 2 is formed in an essentially cylindrical shape and has a plurality of engagement recesses 21 on the outer circumferential surface. Each engagement recess 21 of the outer ring 2 engages an engagement protrusion 55 of the housing member 5. As a result, the outer ring 2 cannot rotate relative to the housing member 5. Since the housing member 5 cannot rotate about the rotational axis O, the outer ring 2 also cannot rotate about the rotational axis O.

The outer ring 2 is disposed so as to seal the opening-end surface of each housing hole 51. Thus, the outer ring 2 prevents the torsion spring 6 accommodated in each housing hole 51 from coming off and being dislodged from the housing hole 51. Furthermore, the outer ring 2 is supported in the radial direction by the outer peripheral wall portion 54 of the housing member 5.

The outer ring 2 comprises a plurality of cam surfaces 22. Each cam surface 22 is formed on the inner circumferential surface of the outer ring 2. The distance between each cam surface 22 and the rotational axis O changes in the circumferential direction. Specifically, each cam surface 22 is inclined so as to approach the rotational axis O in the clockwise direction in FIG. 2.

Roller

The rollers 4 are disposed between the inner ring 3 and the outer ring 2. Specifically, the rollers 4 are disposed between the outer circumferential surface of the inner ring 3 and the cam surfaces 22 of the outer ring 2. The rollers 4 are disposed at intervals from each other in the circumferential direction. The rollers 4 have a cylindrical shape, and extend along the rotational axis O. That is, the axial direction of the roller 4 is the same as the direction in which the rotational axis O extends. The rollers 4 are able to move between a transmitting position and a non-transmitting position. The rollers 4 are biased toward the transmitting position side by torsion springs 6.

The distance between the outer circumferential surface of the inner ring 3 and the cam surface 22 of the outer ring 2 in the transmitting position is less than the diameter of the rollers 4. Thus, when the rollers 4 are moved to the transmitting position, the rollers 4 dig in between the outer circumferential surface of the inner ring 3 and the cam surface 22 of the outer ring 2. As a result, the rollers 4 transmit power between the inner ring 3 and the outer ring 2.

In the present embodiment, since the outer ring 2 cannot rotate about the rotational axis O, the inner ring 3 also cannot rotate about the rotational axis O when the rollers 4 move to the transmitting position. Specifically, when attempting to turn the handle 16 in the line feeding direction, the inner ring 3 rotates clockwise in FIG. 2, and the rollers 4 move to the transmitting position. Thus, the inner ring 3 cannot rotate, and, as a result, the handle 16 cannot be turned in the line-feeding direction.

The distance between the outer circumferential surface of the inner ring 3 and the cam surface 22 of the outer ring 2 in the non-transmitting position is greater than the diameter of the rollers 4. Thus, when the rollers 4 move to the non-transmitting position, the rollers 4 can rotate about their respective axes between the outer ring 2 and the inner ring 3. As a result, the power of the inner ring 3 is not transmitted to the outer ring 2. That is, the inner ring 3 can rotate. Specifically, when the handle 16 is turned in the line-winding direction, the inner ring 3 rotates counterclockwise in FIG. 2, and the rollers 4 move to the non-transmitting position. Thus, the handle 16, the inner ring 3, the pinion gear 14, and the rotor 15 can rotate in the line-winding direction.

Torsion Spring

As shown in FIGS. 4 and 5, the torsion springs 6 are configured to bias the rollers 4 toward the transmitting position side. The torsion springs 6 are accommodated in the housing holes 51 of the housing member 5. The torsion springs 6 are supported by the inner wall surface 52 that defines the housing holes 51.

Figure 6:
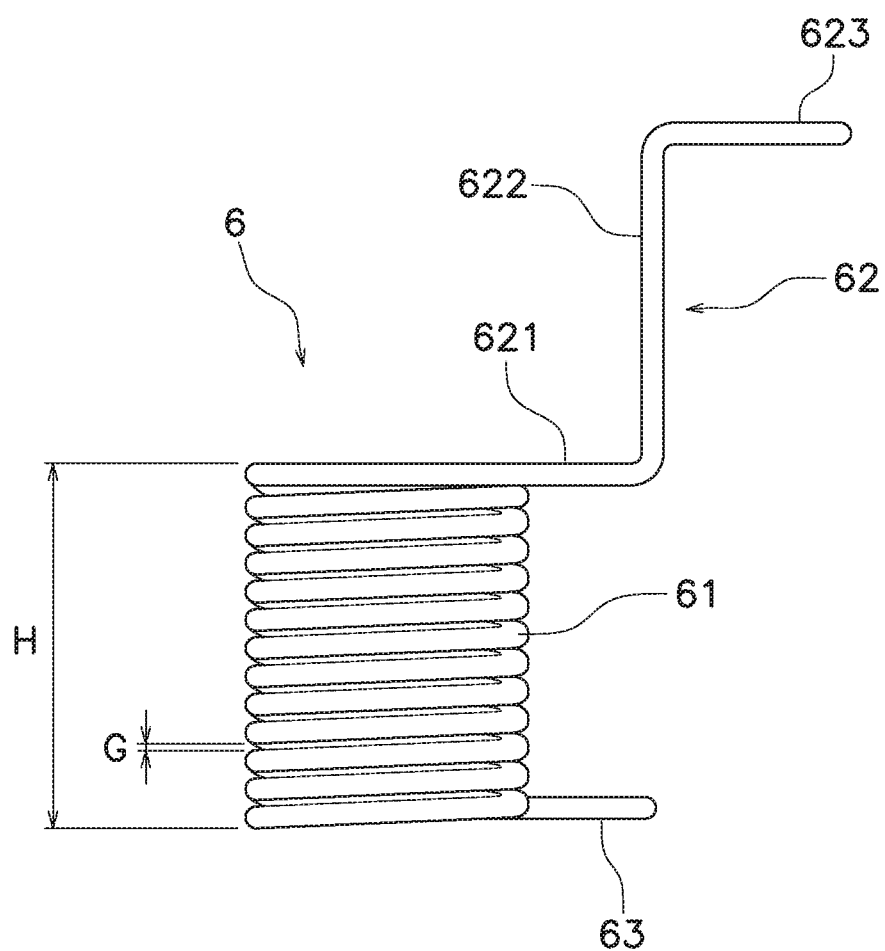
FIG. 6 is a side view of a torsion spring.

As shown in FIG. 6, the torsion spring 6 includes a coil portion 61, a first arm portion 62, and a second arm portion 63. The coil portion 61, the first arm portion 62, and the second arm portion 63 are formed from a single wire. The first arm 62 corresponds to the arm portion of the present invention.

The coil portion 61 is the portion of the torsion spring 6 that is wound into the form of a coil; the coil portion 61 is accommodated in the cylindrical portion 511 of the housing hole 51. The coil portion 61 extends in the axial direction. As shown in FIG. 3, the coil portion 61 is adjacent to the outer ring 2 in the axial direction. Thus, the coil portion 61 is disposed so as to essentially not overlap the roller 4 as viewed in the radial direction. The end portion of the coil portion 61 may overlap the roller 4.

As shown in FIG. 6, the natural height H of the coil portion 61 is greater than the closed height of the coil portion 61. In other words, the coil portion 61 can be compressed. In the coil portion 61, there are gaps G between adjacent coils, and adjacent coils are not in contact with each other. Even in a state in which the torsion spring 6 is mounted, there are gaps G between adjacent coils in the coil portion 61, and adjacent coils are not in contact with each other.

The first arm portion 62 extends from the coil portion 61 in a step-wise manner. The first arm portion 62 biases the roller 4 toward the transmitting position. The first arm portion 62 abuts the outer circumferential surface of the roller 4. The first arm portion 62 includes a first intermediate portion 621, a second intermediate portion 622, and a pressing portion 623. The second intermediate portion 622 corresponds to the intermediate portion of the present invention.

The first intermediate portion 621 extends from the coil portion 61 in a direction orthogonal to the axial direction. More specifically, the first intermediate portion 621 extends from the coil portion 61 in a tangential direction.

Figure 7:
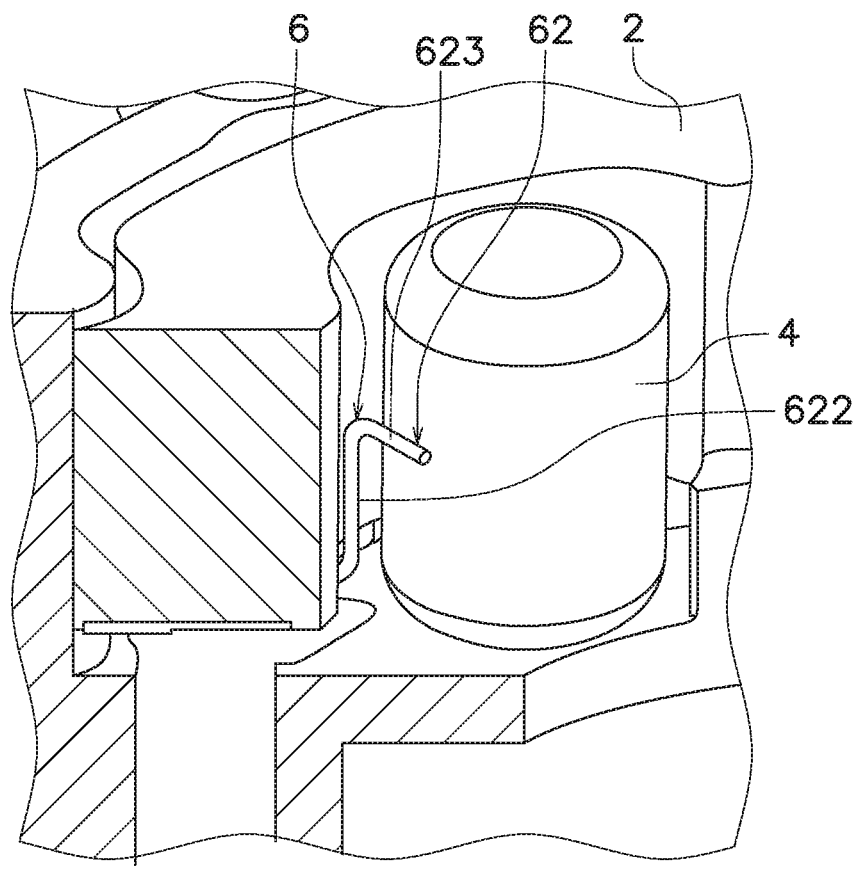
FIG. 7 is a perspective view of the torsion spring showing a contact position between the torsion spring and a roller.

As shown in FIGS. 6 and 7, the second intermediate portion 622 extends from the distal end portion of the first intermediate portion 621 in the axial direction of the roller 4. That is, the second intermediate portion 622 extends in a direction orthogonal to the first intermediate portion 621. The second intermediate portion 622 extends along the inner circumferential surface of the outer ring 2. In addition, the second intermediate portion 622 extends along the outer circumferential surface of the roller 4. The second intermediate portion 622 extends to the central portion of the roller 4 in the axial direction.

The pressing portion 623 extends from the distal end portion of the second intermediate portion 622 in a direction orthogonal to the axial direction of the roller 4. It is not necessary that the direction in which the pressing portion 623 extends be perfectly aligned with a direction orthogonal to the axial direction of the roller 4. Although the angle formed between the axial direction of the roller 4 and the direction in which the pressing portion 623 extends depends upon, for example, the diameter of the roller 4 and the distance between the transmitting position and the non-transmitting position (the rolling movement distance of the roller), if this angle is within ±10 degrees of 90 degrees, the pressing portion 623 can be considered to extend in a direction orthogonal (or substantially orthogonal) to the axial direction of the roller 4.

The pressing portion 623 contacts the roller 4 and presses against the roller 4. As a result, the rollers 4 are biased toward the transmitting position side by the torsion springs 6. The pressing portion 623 presses against the central portion of the roller 4 in the axial direction.

The second arm portion 63 extends from the coil portion 61 in a direction orthogonal to the axial direction. Unlike the first arm portion 62, the second arm portion 63 extends in a straight line.

As shown in FIG. 4, the second arm portion 63 is disposed in the extended portion 512. The second arm portion 63 abuts the inner wall surface 52 in the extended portion 512. Attachment is carried out when the angle between the first and second arm portions 62 and 63 being wider than the angle when the arm portions are free.

Although an embodiment of the present invention was described above, the present invention is not limited to these embodiments, and various modifications can be made without departing from the scope of the invention.

In the embodiment described above, an outer ring 2 is attached so as to be incapable of rotating about a rotational axis O, but the outer ring 2 may rotate about the rotational axis O. In this case, when rollers 4 move to a transmitting position, the power of an inner ring 3 is transmitted to the outer ring 2, and the inner ring 3 and the outer ring 2 rotate integrally.

In the embodiment described above a torsion spring 6 is accommodated inside the housing hole 51 of the housing member 5 and supported by an inner wall surface 52, but no limitation is imposed thereby. For example, the torsion spring 6 may be supported by a pin, etc., extending through a coil portion 61.

In the embodiment described above the torsion spring 6 biases the roller 4 toward the transmitting position side, but no limitation is imposed thereby. For example, the torsion spring 6 may bias the roller 4 toward the non-transmitting position as well.

What is claimed is:

1. A roller clutch for a fishing reel, comprising:
   an outer ring;
   an inner ring disposed on a radially inward side of the outer ring;
   a roller disposed between the inner ring and the outer ring and movable between a transmitting position for transmitting power between the outer ring and the inner ring and a non-transmitting position for canceling the transmission of the power; and
   a torsion spring configured to bias the roller toward one of the transmitting position and the non-transmitting position,
   the torsion spring comprises a coil portion and first and second arm portions extending from the coil portion, and
   the first arm portion comprises a pressing portion extending in a direction orthogonal to an axial direction of the roller and configured to contact the roller.

2. The roller clutch for a fishing reel according to claim 1, wherein
   the coil portion of the torsion spring is adjacent to the outer ring or the inner ring in the axial direction.

3. The roller clutch for a fishing reel according to claim 1, wherein
   the coil portion of the torsion spring is disposed so as not to overlap the roller as viewed in the radial direction.

4. The roller clutch for a fishing reel according to claim 1, wherein
   the first arm portion further comprises an intermediate portion extending in the axial direction of the roller, and
   the pressing portion extends from a distal end portion of the intermediate portion.

5. The roller clutch for a fishing reel according to claim 1, wherein
   the pressing portion of the first arm portion contacts a central portion of the roller in the axial direction.

6. The roller clutch for a fishing reel according to claim 1, wherein
   the coil portion of the torsion spring has a natural height that is greater than a closed height of the coil portion.

7. The roller clutch for a fishing reel according to claim 1, wherein
   the coil portion is one of a plurality of coil portions and adjacent coils in the plurality of coil portions are not in contact with each other.

8. The roller clutch for a fishing reel according to claim 1, further comprising
   a housing member having housing holes configured to accommodate the torsion spring.

9. The roller clutch for a fishing reel according to claim 1, wherein
   the torsion spring is disposed in a housing hole of the housing and supported by an outer surface defining the housing hole.

* * * * *